(12) United States Patent
Gibbs et al.

(10) Patent No.: US 12,415,393 B2
(45) Date of Patent: Sep. 16, 2025

(54) AMPHIBIAN

(71) Applicant: Gibbs Technologies Limited, Nuneaton (GB)

(72) Inventors: Alan Timothy Gibbs, London (GB); Simon James Longdill, Nuneaton (GB); Matthew Watson Houston, Nuneaton (GB)

(73) Assignee: Gibbs Technologies Limited, Nuneaton (GB)

( * ) Notice: Subject to any disclaimer, the term of this patent is extended or adjusted under 35 U.S.C. 154(b) by 0 days.

(21) Appl. No.: 16/940,560

(22) Filed: Jul. 28, 2020

(65) Prior Publication Data

US 2021/0039461 A1 Feb. 11, 2021

Related U.S. Application Data

(63) Continuation of application No. 15/517,594, filed as application No. PCT/GB2015/052992 on Oct. 12, 2015.

(30) Foreign Application Priority Data

Oct. 10, 2014 (GB) ..................... 1418008
Jun. 8, 2015 (GB) ..................... 1509901

(51) Int. Cl.
*B60F 3/00* (2006.01)

(52) U.S. Cl.
CPC .......... *B60F 3/0069* (2013.01); *B60F 3/0007* (2013.01); *B60F 3/003* (2013.01); *B60F 3/0038* (2013.01)

(58) Field of Classification Search
CPC .......... B60F 3/00; B60F 3/0007; B60F 3/003; B60F 3/0038; B60F 3/0061; B60F 3/0069; B60F 3/0084

(Continued)

(56) References Cited

U.S. PATENT DOCUMENTS 3,269,349 A * 8/1966 Gehlen ................... E01D 15/22
14/2.6
3,486,477 A 12/1969 Pender
(Continued)

FOREIGN PATENT DOCUMENTS

CN 1213482 C 8/2005
CN 100343456 C 10/2007
(Continued)

OTHER PUBLICATIONS

Chinese Patent Office; Search Report; Oct. 12, 2015; entire document.

*Primary Examiner* — Daniel V Venne
(74) *Attorney, Agent, or Firm* — Price Heneveld LLP

(57) ABSTRACT

An amphibian includes a planing hull, first and second sides, at least one retractable wheel, at least one prime mover, at least one steerable wheel which is connected to a steering control device operable by a driver to steer the amphibian, wherein the steering control device includes at least one of handlebars, a steering wheel, and steering levers, and is positioned to be grasped by an operator while operating the amphibian and wherein the steering control device is moveable between at least two distinct laterally spaced positions across a width of the amphibian between a center line and the respective sides of the planing hull.

22 Claims, 10 Drawing Sheets

(58) Field of Classification Search
USPC .......... 440/12.5, 12.51, 12.52, 12.54, 12.57, 440/12.59, 12.66
See application file for complete search history.

(56) References Cited

U.S. PATENT DOCUMENTS

| | | | | |
|---|---|---|---|---|
| 3,765,368 | A * | 10/1973 | Asbeck | B63C 13/00 440/12.54 |
| 3,898,949 | A | 8/1975 | Kearsey | |
| 3,903,831 | A * | 9/1975 | Bartlett | B60F 3/00 114/344 |
| 3,933,112 | A | 1/1976 | Veazey | |
| 5,341,895 | A | 8/1994 | Grinberg et al. | |
| 5,417,177 | A | 5/1995 | Taguchi | |
| 5,590,617 | A * | 1/1997 | Gere | B60F 3/0007 440/12.51 |
| 5,689,669 | A | 11/1997 | Engler | |
| 5,727,494 | A | 3/1998 | Caserta | |
| 5,832,862 | A | 11/1998 | Hulten | |
| 5,836,635 | A | 11/1998 | Dorman | |
| RE36,901 | E | 10/2000 | Roycroft et al. | |
| 6,482,052 | B1 * | 11/2002 | Giljam | B60F 3/0007 440/12.51 |
| 6,580,541 | B1 * | 6/2003 | Yamashita | B60F 3/0007 398/104 |
| 6,666,735 | B2 | 12/2003 | Benoit | |
| 7,934,963 | B1 | 5/2011 | Carambat | |
| 8,221,174 | B2 * | 7/2012 | March | B60F 3/0038 440/12.51 |
| 2002/0002939 | A1 * | 1/2002 | Beauchesne | B60F 3/0007 114/382 |
| 2005/0283288 | A1 * | 12/2005 | Howell | B62D 1/18 701/41 |
| 2007/0093148 | A1 | 4/2007 | Gibbs et al. | |
| 2008/0227344 | A1 * | 9/2008 | Gaither | B60F 3/0007 440/12.5 |
| 2009/0004932 | A1 * | 1/2009 | Jeffery | B60F 3/0007 440/12.51 |
| 2012/0010818 | A1 | 1/2012 | Kalish | |
| 2012/0108118 | A1 * | 5/2012 | Longdill | B62K 9/00 440/12.52 |
| 2014/0130658 | A1 * | 5/2014 | Gonzalez | F41H 7/042 89/36.08 |
| 2014/0288763 | A1 * | 9/2014 | Bennett | B62D 11/18 701/31.6 |

FOREIGN PATENT DOCUMENTS

| | | |
|---|---|---|
| CN | 101087699 A | 12/2007 |
| CN | 103434560 A | 12/2013 |
| DE | 2350971 A1 | 4/1975 |
| EP | 1581402 A | 10/2005 |
| FR | 2385562 A1 | 10/1978 |
| GB | 2392415 | 3/2004 |
| GB | 2401829 A | 11/2004 |
| WO | 9015747 | 12/1990 |
| WO | 9523074 | 8/1995 |
| WO | 2000074960 A1 | 12/2000 |
| WO | 2004020228 A1 | 3/2004 |

\* cited by examiner

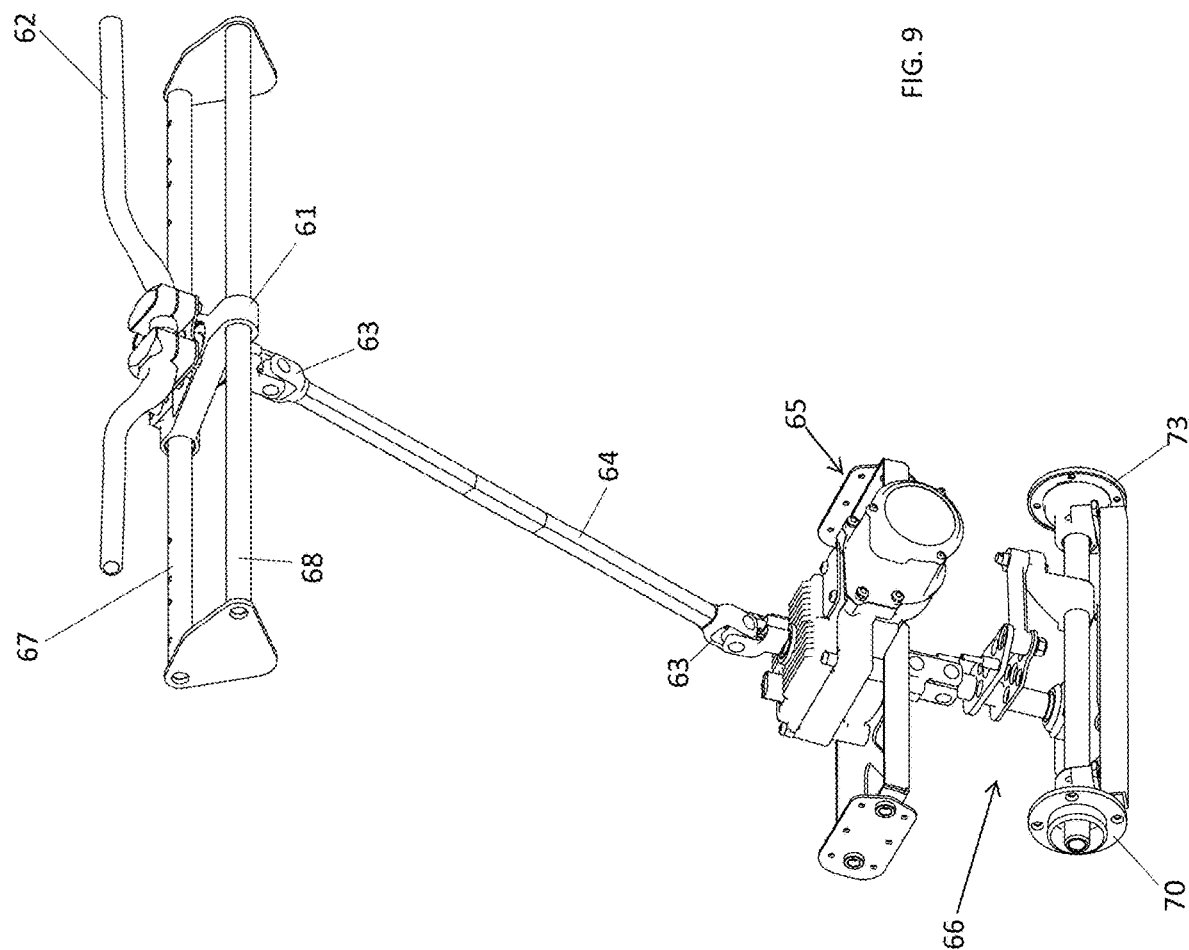

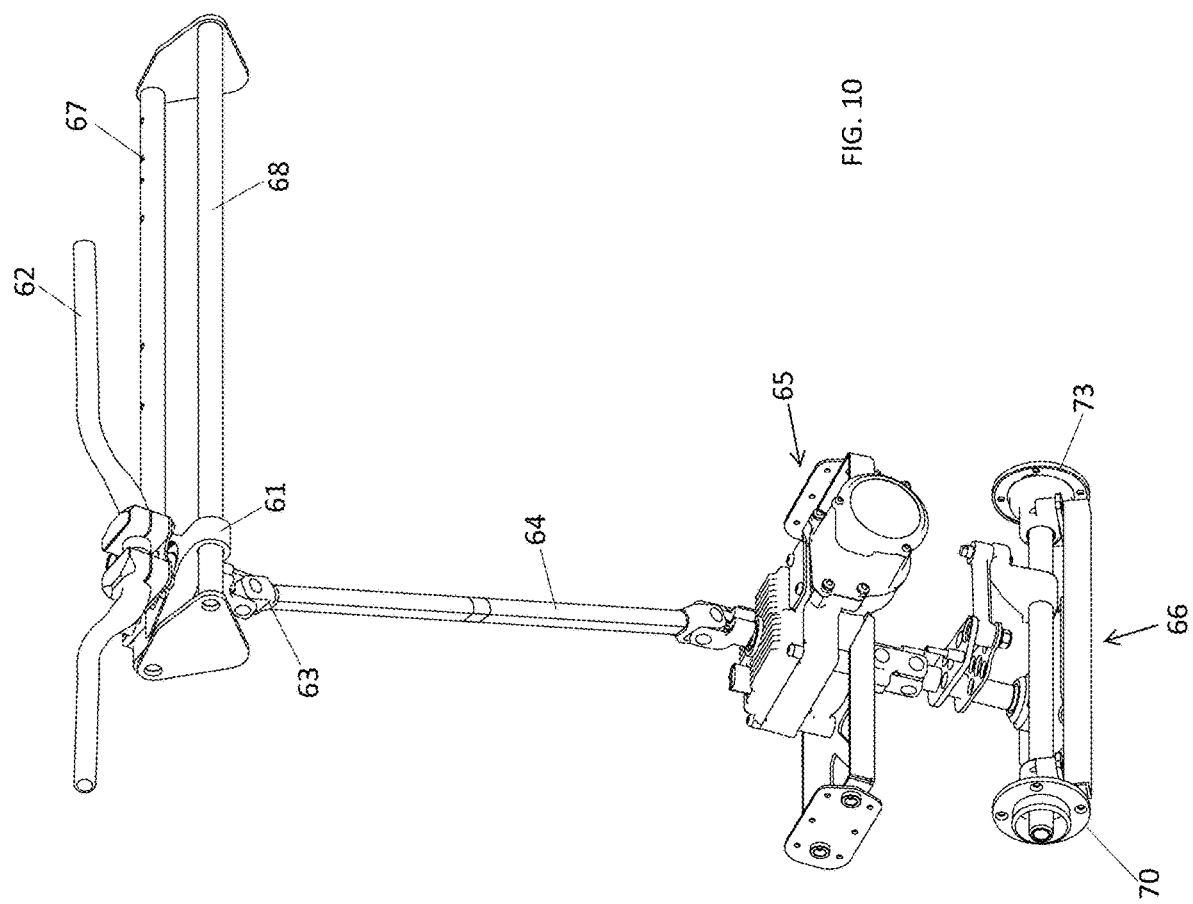

AMPHIBIAN

CROSS-REFERENCE OF RELATED APPLICATIONS

The present application is a continuation of U.S. patent application Ser. No. 15/517,594, filed Apr. 7, 2017, entitled "AMPHIBIAN," which claims benefit to PCT Application No. PCT/GB2015/052992, filed Oct. 12, 2015, entitled "AMPHIBIAN," the entire disclosures of which are incorporated herein.

BACKGROUND OF THE INVENTION

The present invention relates to an amphibian and, in particular, to a high speed amphibian having what is typically referred to in land-going vehicles as utility task vehicle (UTV) capability. Preferably, the amphibian has seating arranged in a side-by-side manner.

Land-going UTVs and all terrain vehicles (ATVs) are well known in the art and have certain similarities. However, they are distinct vehicles intended for different uses and so adopt different configurations. An ATV is typically an off-road, sit-astride vehicle intended for use by a rider as a recreational vehicle, with capability for riding over rough terrain. A UTV is also intended for use over rough terrain, but this vehicle is driven rather than ridden and often referred to as a side-by-side vehicle because two or more people can sit in the driver area or cab next to each other on a bench seat(s) or bucket seat(s). In addition, a UTV is typically provided with a roll bar or roll cage arrangement. Further, a UTV is designed to carry or haul loads and so typically features a cargo area or truck-like bed specifically for this purpose.

Amphibians are now well known in the art. An amphibian is a vehicle which is able to move on both land and water. Historically, prior art amphibians either optimised operation in the land mode when used on land or, alternatively, optimised operation in the marine mode when used in water. The result was an amphibian having poor performance in one mode of operation or the other.

SUMMARY OF THE INVENTION

The present applicant has identified a need for an amphibian having UTV capability on land and which performs as a high speed watercraft on water.

In a first aspect, the present invention provides an amphibian operable on land and in/on water, comprising:
 a planing hull;
 at least one retractable wheel, the at least one retractable wheel being retractable from a protracted land engaging position when the amphibian is operated on land to a retracted position when the amphibian is operated in/on water;
 at least one prime mover for providing power to drive, directly or indirectly, the amphibian on land and in/on water;
 at least one steerable wheel which is, at least when the amphibian is operated on land, connected directly or indirectly to a steering control device operable by a driver to steer the amphibian; and wherein
 the steering control device is moveable between at least two distinct laterally spaced positions across the width or beam of the amphibian.

In a second aspect, the present invention provides an amphibian operable on land and in/on water, comprising:
 a planing hull;
 at least one retractable wheel, the at least one retractable wheel being retractable from a protracted land engaging position when the amphibian is operated on land to a retracted position when the amphibian is operated in/on water;
 at least one prime mover for providing power to drive, directly or indirectly, the amphibian on land and in/on water;
 at least one steerable wheel which is, at least when the amphibian is operated on land, connected directly or indirectly to a steering control device operable by a driver to steer the amphibian; and
 side-by-side seating.

In a third aspect, the present invention provides an amphibian operable on land and in/on water, comprising:
 a planing hull;
 at least one retractable wheel, the at least one retractable wheel being retractable from a protracted land engaging position when the amphibian is operated on land to a retracted position when the amphibian is operated in/on water;
 at least one prime mover for providing power to drive, directly or indirectly, the amphibian on land and in/on water;
 at least one steerable wheel which is, at least when the amphibian is operated on land, connected directly or indirectly to a steering control device operable by a driver to steer the amphibian; and
 a roll over protection system.

In a fourth aspect, the present invention provides an amphibian operable on land and in/on water, comprising:
 a planing hull;
 at least one retractable wheel, the at least one retractable wheel being retractable from a protracted land engaging position when the amphibian is operated on land to a retracted position when the amphibian is operated in/on water;
 at least one prime mover for providing power to drive, directly or indirectly, the amphibian on land and in/on water;
 at least one steerable wheel which is, at least when the amphibian is operated on land, connected directly or indirectly to a steering control device operable by a driver to steer the amphibian; and
 a cargo area or truck-like bed, preferably open.

In a fifth aspect, the present invention provides an amphibian operable on land and in/on water, comprising:
 a planing hull;
 at least one retractable wheel, the at least one retractable wheel being retractable from a protracted land engaging position when the amphibian is operated on land to a retracted position when the amphibian is operated in/on water;
 at least one prime mover for providing power to drive, directly or indirectly, the amphibian on land and in/on water;
 at least one steerable wheel which is, at least when the amphibian is operated on land, connected directly or indirectly to a steering control device operable by a driver to steer the amphibian; and
 two seat belts and three seat belt buckles or buckle positions, or two seat belt buckles or buckle positions, and three seat belts.

In a sixth aspect, the present invention provides an amphibian operable on land and in/on water, comprising:
 a planing hull;

at least one retractable wheel, the at least one retractable wheel being retractable from a protracted land engaging position when the amphibian is operated on land to a retracted position when the amphibian is operated in/on water;

at least one prime mover for providing power to drive, directly or indirectly, the amphibian on land and in/on water;

at least one steerable wheel which is, at least when the amphibian is operated on land, connected directly or indirectly to a steering control device operable by a driver to steer the amphibian; and a footwell area having no transmission tunnel.

In a seventh aspect, the present invention provides an amphibian operable on land and in/on water, comprising:

a planing hull;

at least one retractable wheel, the at least one retractable wheel being retractable from a protracted land engaging position when the amphibian is operated on land to a retracted position when the amphibian is operated in/on water;

at least one prime mover for providing power to drive, directly or indirectly, the amphibian on land and in/on water;

at least one steerable wheel which is, at least when the amphibian is operated on land, connected directly or indirectly to a steering control device operable by a driver to steer the amphibian; and a footwell and seating area configured so as not to impede or restrict driver and/or passenger entry via one side of the amphibian, egress from the other side of the amphibian, and through movement therebetween.

In an eighth aspect, the present invention provides an amphibian operable on land and in/on water, comprising:

a planing hull;

at least one retractable wheel, the at least one retractable wheel being retractable from a protracted land engaging position when the amphibian is operated on land to a retracted position when the amphibian is operated in/on water;

at least one prime mover for providing power to drive, directly or indirectly, the amphibian on land and in/on water;

at least one steerable wheel which is, at least when the amphibian is operated on land, connected directly or indirectly to a steering control device operable by a driver to steer the amphibian; and a positive buoyancy system and/or deployable righting system.

In a ninth aspect, the present invention provides an amphibian operable on land and in/on water, comprising:

a planing hull;

at least one retractable wheel, the at least one retractable wheel being retractable from a protracted land engaging position when the amphibian is operated on land to a retracted position when the amphibian is operated in/on water;

at least one prime mover for providing power to drive, directly or indirectly, the amphibian on land and in/on water;

at least one steerable wheel which is, at least when the amphibian is operated on land, connected directly or indirectly to a steering control device operable by a driver to steer the amphibian; and an interlock or safety system which prevents operation/activation of at least one driver or automatically controlled parameter of the amphibian unless sensing/determining a first condition has been satisfied.

These and other features, advantages and objects of the present invention will be further understood and appreciated by those skilled in the art by reference to the following specification, claims and appended drawings.

BRIEF DESCRIPTION OF THE DRAWINGS

Preferred embodiments of the present invention will now be described by way of example only with reference to the accompanying drawings, in which;

FIG. 9 is a schematic perspective view from behind and to the side of the steering assembly of FIG. 8 with the steering control device shown in a central position, spaced laterally from left hand and right hand positions;

FIG. 10 is a schematic perspective view from behind and to the side of the steering assembly of FIG. 8 with the steering control device shown in a left hand position, spaced laterally from right hand and centre positions;

DETAILED DESCRIPTION OF PREFERRED EMBODIMENT

Figure 1:
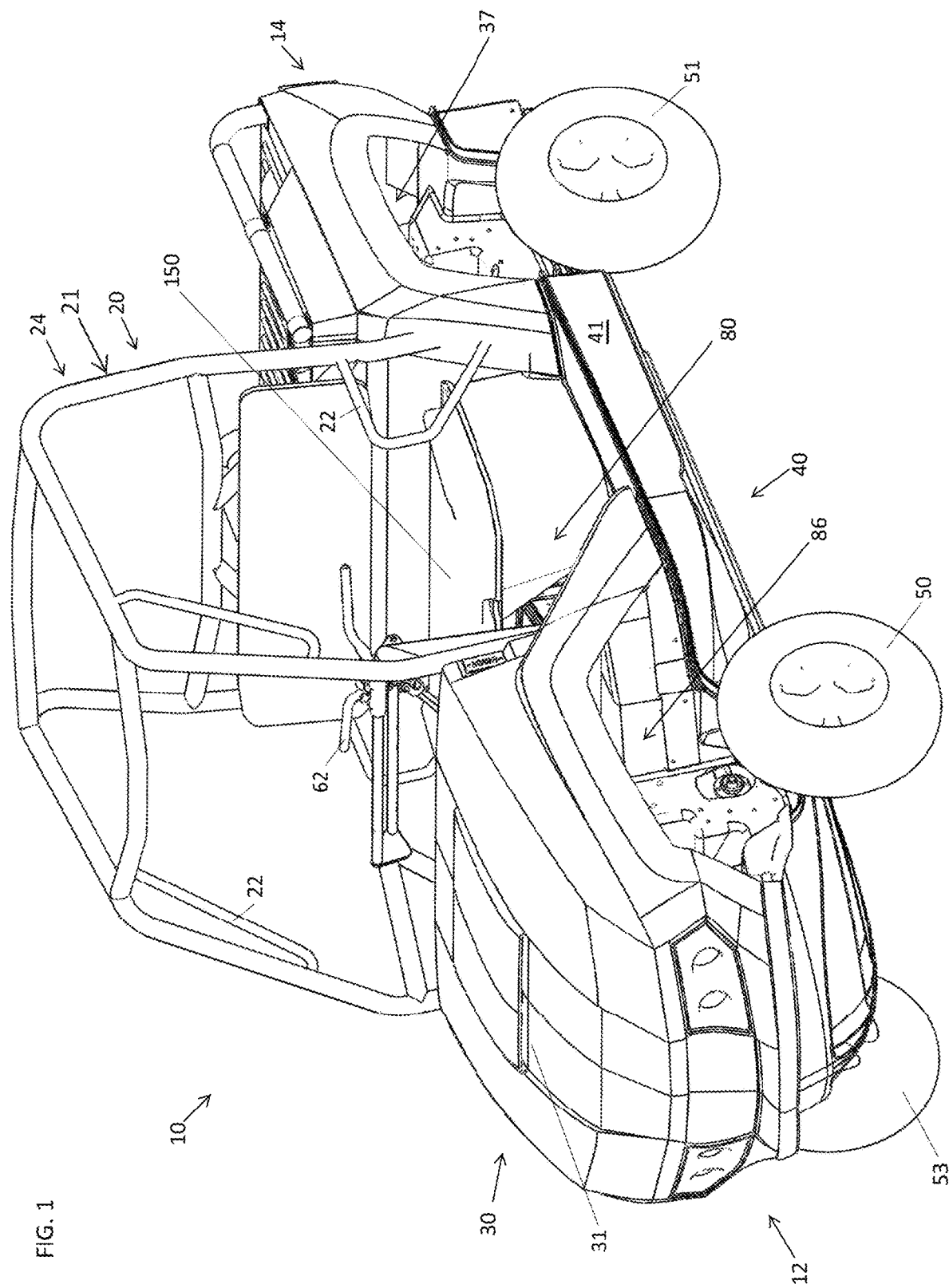
FIG. 1 is a schematic perspective view from the front and above of an amphibian according to the present invention with its wheels shown in a protracted land engaging position (certain parts omitted for clarity)
Figure 3:
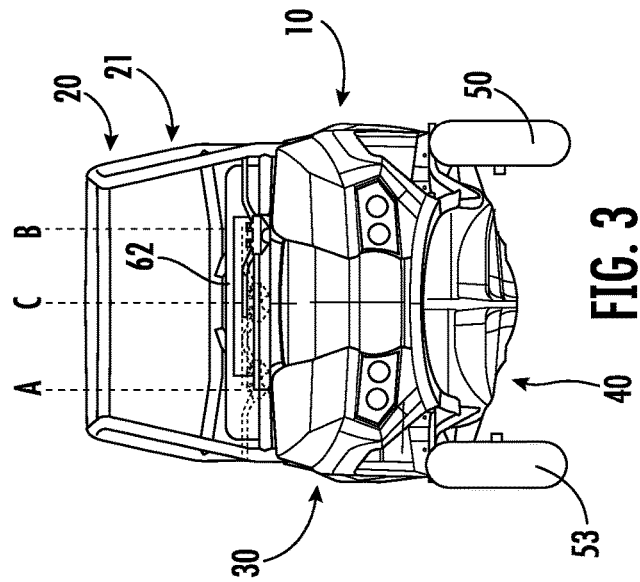
FIG. 3 is a schematic front elevation view of the amphibian of FIG. 1 with its wheels shown in a protracted land engaging position.
Figure 2:
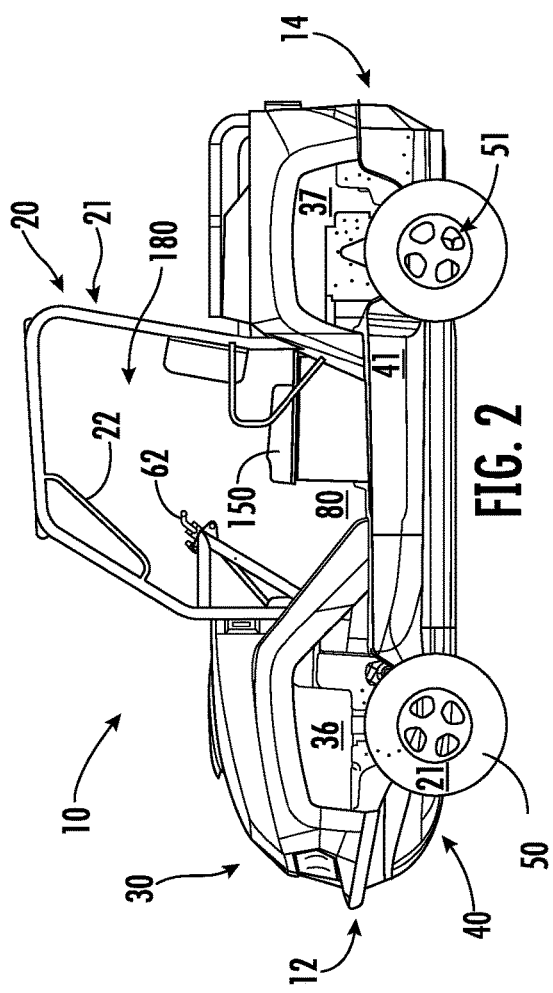
FIG. 2 is a schematic side elevation view of the amphibian of FIG. 1 with its wheels shown in a protracted land engaging position.
Figure 4:
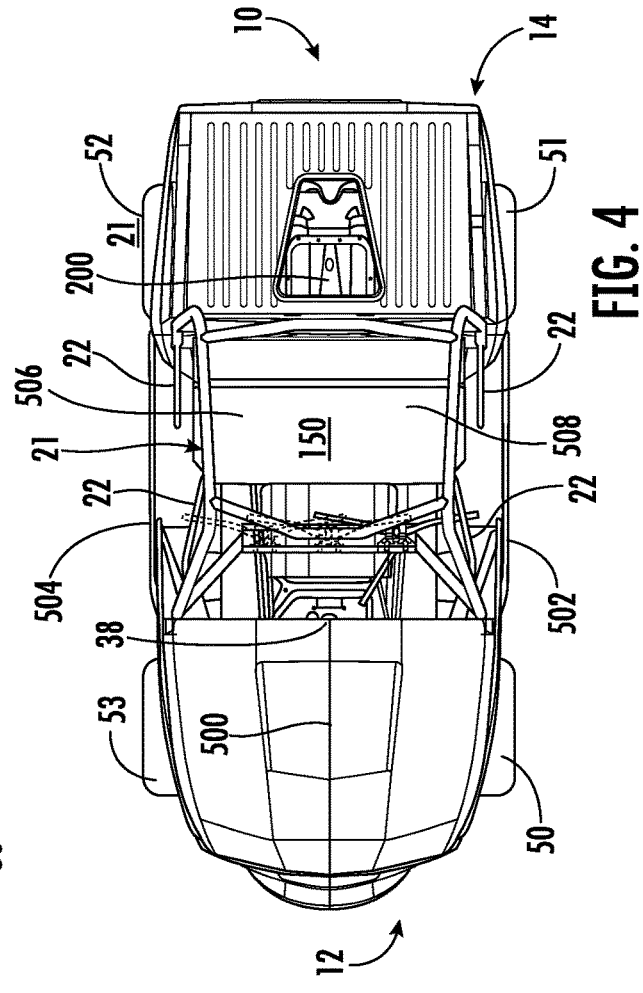
FIG. 4 is a schematic top plan view of the amphibian of FIG. 1 with its wheels shown in a protracted land engaging position.

The amphibian 10 has four road wheels 50, 51, 52, 53 which are connected to the remainder of the amphibian 10 by a wheel suspension and retraction system (omitted for clarity) for moving the wheels 50, 51, 52, 53 between a protracted land engaging position for use on land in a land mode of the amphibian 10 and a retracted position for use in/on water in a marine mode of the amphibian 10. The front wheels 50 and 53 are steerable by a driver of the amphibian 10 via a steering assembly 60, with a steering control device in the form of handlebars 62 in the preferred embodiment shown. Alternatively, the steering control device could take the form of a steering wheel, steering levers, or any other suitable steering control device capable of conveying a steering input from the driver. The rear wheels 51, 52 are driven to propel the amphibian 10 on land in the preferred embodiment shown, although as an alternative front and/or four wheel drive may be employed. Further, as an alternative, any one or more of the wheels may be driven in use of the amphibian 10. One or more marine propulsion devices 300 propel the amphibian 10 in/on water, and this/these may take the form of a jet drive(s) and/or propeller(s), for example, where the marine propulsion devices 300 may be conventional. Power is provided by way of one or more prime movers 200, such as an internal combustion engine, electric or hydraulic motor, and may be delivered to the wheel(s) and/or marine propulsion device(s) 300 via a transmission directly, or indirectly via a gearbox or other speed change device such as a speed change transmission 250 (e.g. continuously variable transmission) used to vary the speed of the output from the prime mover(s) 200 relative to the input drive to the one or more driven wheels and/or marine propulsion device(s) 300, where the speed change transmission may be conventional.

The structure of the amphibian 10 comprises an upper body 30, a roll over protection system (ROPS) 20 in the form of a roll cage, and a hull 40. The body 30 and the roll cage of the ROPS 20 are separately connected to (but demountable from, as a whole or in parts) the hull 40. This permits ease of access to internal components of amphibian 10 for servicing, etc. A cargo area or truck-like bed is provided, preferably open, and preferably behind the roll over protection system (ROPS). Alternatively, the roll over protection system (ROPS) may extend to at least partially afford protection to the cargo area or truck-like bed. In an alternative embodiment, the cargo area or truck-like bed is provided close to the water line so as to ease loading and unloading, e.g. for launch and/or recovery of people in a rescue situation. As a further alternative, the cargo area or truck-like bed may be moveable between a first position above the water line and a second position provided close to the water line for ease loading and unloading.

The roll cage of the ROPS 20 forms an integral part of the entire structure of the amphibian 10. It is a structural component and not merely cladding. Typically it takes the form of one or more elongate tubular or angled section structural members, one or more of which are directly connected to the composite structure of the hull 40 (e.g. glass fibres or carbon fibres set in resin) and not via an intermediate frame or chassis. As such, overall weight is reduced yet stiffness and strength improved. Handles and/or grab rails 22 are optionally provided. In addition, or alternatively, optional webbing 'doors' and/or restraint bars (not shown) can be provided where doors in a traditional vehicle are provided. The roll cage of the ROPS 20 provides an ideal structure for mounting or location of these optional handles and/or grab rails 22 and webbing 'doors' and/or restraint bars. Where localised areas of strength are required to help form or enhance the integrity of the connection of the roll cage 20 of the ROPS with the body 30 and/or hull 40, extra layers or mats of fibres and/or or other (e.g. metal) components may be laid down in the body 30 and/or hull 40 during manufacture. The body 30 and/or hull 40 themselves can be formed with localised reinforced areas as necessary, and provide a complete support structure for components making up the amphibian 10. In the preferred form of roll cage of the ROPS 20 shown, a cab area 180 is defined and is where a driver and passengers of the amphibian 10 are seated in use. An upper frame portion 24 of the roll cage 20 of the ROPS can be seen protrude above the upper surfaces of the body 30, providing over head, front, rear and side protection for the driver and passengers of the amphibian 10. Furthermore, the roll cage of the ROPS 20 provides an ideal structure for mounting or location of a towing hook and/or rope, e.g. for use in wakeboarding where the added height provides for more lift when conducting jumps and/or aerial tricks. Yet further, the roll cage of the ROPS 20 provides an ideal structure for i) storage of items, ii) mounts for locating or storing items, or iii) mounting or location of storage bins/containers, e.g. for wakeboards, waterskis, fishing rods or other sporting apparatus, and/or tools.

A side-by-side seating configuration is provided in the form of a bench seat 150. The bench seat 150 extends laterally across (transversely) the width (beam) of the amphibian 10, including a first seating position 506 and a second seating position 508. This provides for at least three distinct laterally spaced offset driving positions of the amphibian 10, i) right hand drive or first position A, ii) centre drive or third position C and iii) left hand drive or second position B. Optional seatbelts and seatbelt buckles, or harnesses, may be provided, as necessary or required by local legislation. Again, the roll cage of the ROPS 20 provides an ideal structure for mounting or location of these seatbelts and seatbelt buckles, or harnesses. Where a three seat configuration is adopted as described above, it has been determined by the applicant that a particularly effective arrangement is to have either two seat belts and three seat belt buckles or buckle positions, or two seat belt buckles or buckle positions, and three seat belts. In the former case, by arranging the three seatbelt buckles/positions spaced laterally across the amphibian and/or bench seat 150 with two seat belts, it has been found that this can provide an optimised solution which does not restrict entry to, or egress from, the amphibian 10. Similarly, in the latter case, by arranging the two seatbelt buckles/positions spaced laterally at, for example, substantially the ⅓ and ⅔ positions across the amphibian and/or bench seat 150 with three seat belts, it has been found that this can provide an optimised solution which does not restrict entry to, or egress from, the amphibian 10. As will be described further below, the steering assembly in fact provides for a multitude of driving positions across the full width of the amphibian, providing a flexibility which increases the functionality of the amphibian 10. As an alternative to a bench seat 150, one or more bucket seats may instead be provided. Indeed, this provides further flexibility, as one or more bucket seats and/or bench seats may be modular in nature and utilised and positioned as necessary and accordingly across the width (beam) of the amphibian 10, so as to provide for various driving and passenger positions and configurations, Indeed, multiple rows of seating may be provided, even using a mix of seating types and arrangements. Where bucket seats are used, these can be mounted so as to permit a swivel action to enable a driver and/or passenger(s) to, for example, fish out of a/each side of the amphibian 10 while seated. A complimentary footwell area 80 also extends laterally across (transversely) the width (beam) of the amphibian 10, so as to accommodate all possible driving positions. The footwell area 80 is optionally provided with means to bail automatically any water shipped in use of the amphibian 10. One such example of a means to bail automatically is the provision of a cambered floor, or cambered floor portions (e.g. arranged with a central peak), in the footwell area 80 to direct and channel water away and out of the amphibian 10.

It will be appreciated from the foregoing that the seating and footwell area is configured so as not to impede or restrict the driver and/or passengers but instead to facilitate entry via either side of the amphibian 10, egress from either side of the amphibian 10, and through movement either way therebetween. Indeed, to further assist in this regard, the function of traditional foot pedals can be integrated with the steering assembly or elsewhere in the amphibian 10, as described further below, thus avoiding the need altogether for any foot pedals in the seating and footwell area. Alternatively, the function of traditional foot pedals may be provided by one or more sets of foot pedals, situated as necessary (e.g. at one or more driving positions), in the footwell area or otherwise. Indeed, these foot pedals may be retractable or foldable to clear the footwell or other area, and/or be slidable across the amphibian in a similar manner to that of the steering control device.

Front and rear wheel arches 36, 37 are provided on either side of the amphibian 10 so as to at least partially contain a wheel suspension and/or retraction assembly which is retracted when the amphibian 10 is operating in/on water in the marine mode.

Air inlet opening 31 provides an entry for cooling air (ram and/or fan-assisted) for use by the cooling systems of the amphibian 10. Air entrained via inlet 31 is eventually exhausted via an air outlet (not shown). Between air inlet 31 and air outlet, a dorade system is installed to prevent the ingress of water.

An instrument panel 38 is provided in the cab area 180 to convey relevant parameters (e.g. operating, control and/or status) of the amphibian 10 to the driver. Additionally, side and/or rear view mirrors (not shown) may be provided as necessary as a visual aid to the driver. Furthermore, land and marine navigation lights may also be provided and operate in accordance with the local legislative requirements.

The hull 40 can be seen extending along a longitudinal axis or longitudinally-extending center line 500 of the amphibian 10 from the front bow section 12 to the rear stern section 14, and across a transverse axis of the amphibian 10. Indeed, the hull extends across the width (beam) of the amphibian 10 between the front and rear wheels at hull portion 41 and between a first side 502 and a second side 504. Hull portion 41 provides stability when the amphibian 10 is operated at high speed on water in the marine mode because it provides displacement spaced laterally from the centre line 500 of the amphibian 10. As such, when cornering sharply, for example, an increase in righting force is experienced as the angle of lean increases.

The hull 40 comprises a V formation 42 with a keel section 43 running from the bow 12 of the amphibious vehicle to a point where the keel splits to incorporate a water intake area 44 for a jet drive marine propulsion unit 300. Consequently, the wheels 50, 51, 52, 53 must be protracted and retracted through a greater height in order to provide for good ground clearance of the hull 40 when the amphibian 10 is used on land in land mode, yet provide for the wheels 50, 51, 52, 53 to be clear of the waterline when the amphibian 10 is used in/on water in marine use. However, this strategy does provide for an amphibian having UTV capability both on land and on water. Even with the small footprint of the hull 40 of the amphibian 10, the hull 40 is capable of propelling the amphibian 10 up onto the plane with little difficulty in fast time periods. Surprisingly, in/on-water performance of the amphibian is not compromised and adequate ground clearance is available even for off-road use.

Figure 8:
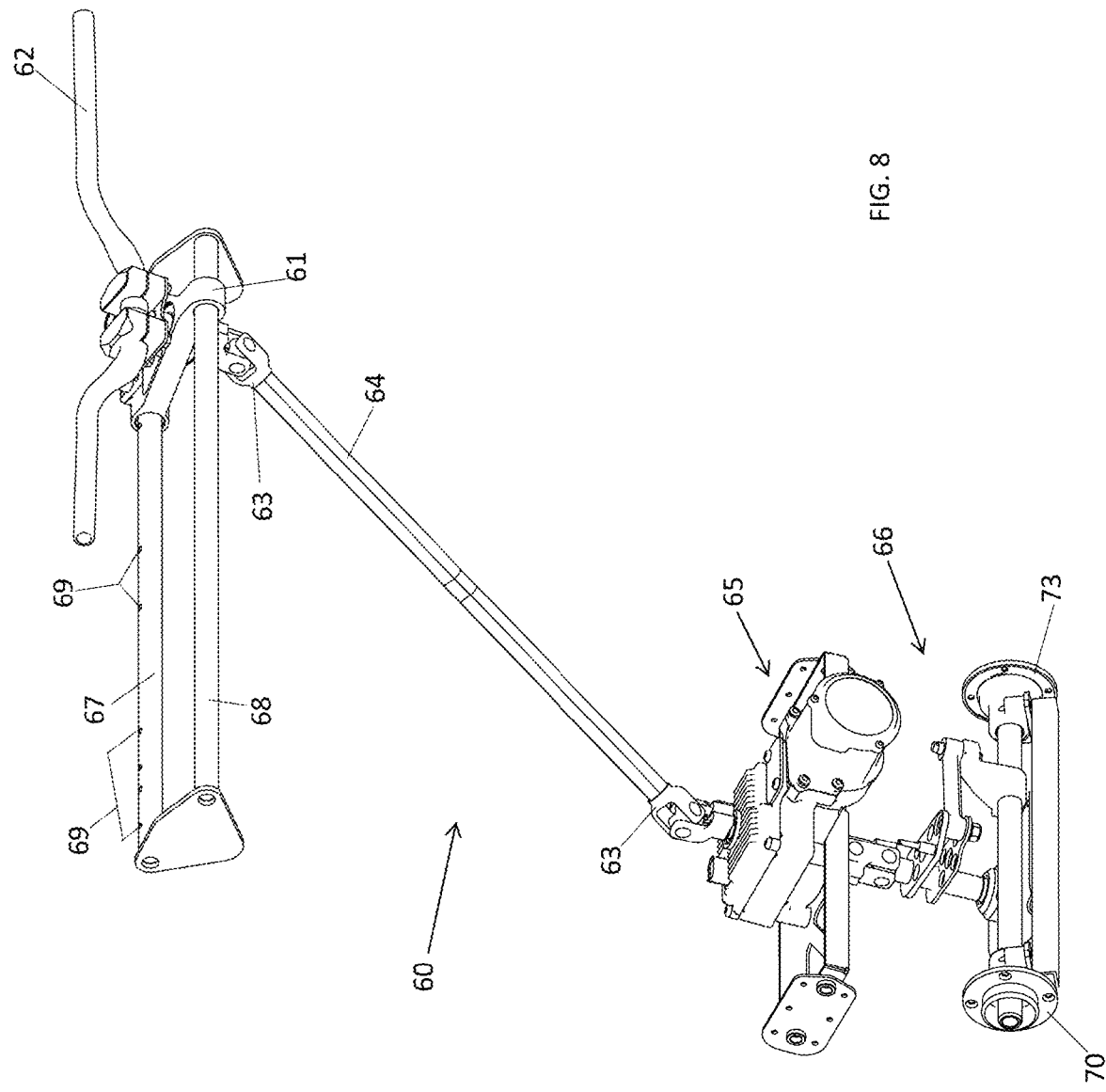
FIG. 8 is a schematic perspective view from behind and to the side of a steering assembly according to the present invention with a steering control device shown in a right hand position, spaced laterally from left hand and centre positions.
Figure 12:
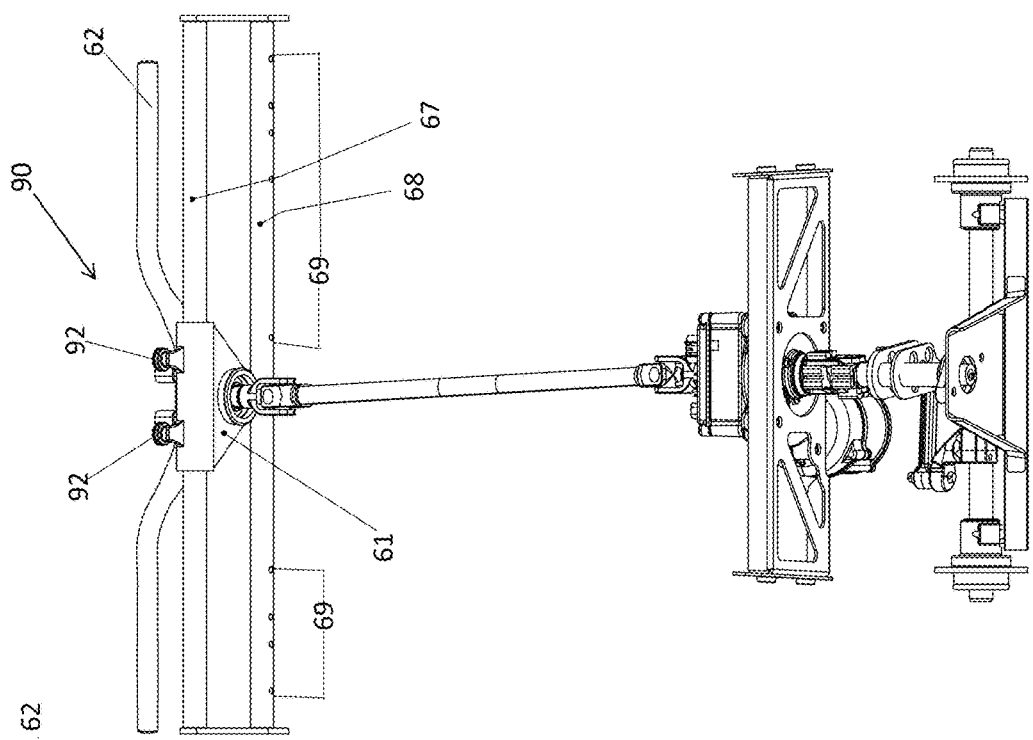
FIG. 12 is a schematic front elevation view of the steering assembly of FIG. 8 with the steering control device shown being moved to the right from a central position.
Figure 11:
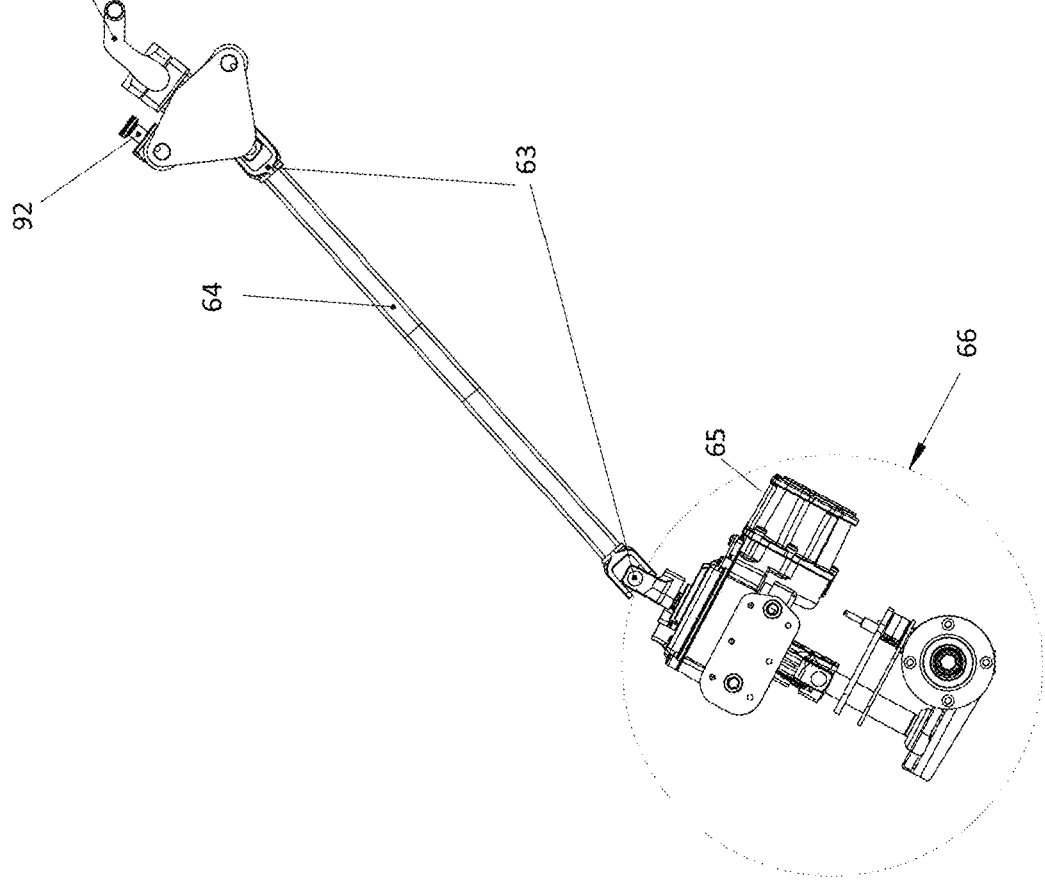
FIG. 11 is a schematic side elevation view of the steering assembly of FIG. 8 with certain parts omitted for clarity.

Next, with reference to FIGS. 8 to 12, the steering assembly 60 can be seen. In FIG. 8 it can be seen that the handlebars 62 are connected by a steering column 64 to a steering mechanism 66 capable of steering the hubs 70, 73. Optional power assisted steering 65 is provided. The hubs 70, 73 connect to front wheels 50, 53 via a suspension upright (omitted for clarity). At each end of the steering column 64 is a universal joint 63 to provide for rotation and articulation. The steering column 64 comprises a splined connection to provide for both the rotation and extension necessary. The handlebars 62 are mounted via a handlebar bearing housing 61 to upper 67 and lower 68 handlebar guide rails which guide lateral translation of the handlebars 62. Together, these features facilitate movement of the handlebars laterally across (transversely) the width (beam) of the amphibian 10. This provides for at least three distinct driving positions of the amphibian 10, i) right hand drive or first position A located between the centre line 500 and the second side 504, ii) centre drive or third position C located along the centre line 500 and iii) left hand drive or second position B located between the first side 502 and the centre line 500.

An interlock safety device 90 comprises one or more biased locking pins 92 mounted via a handlebar bearing housing 61, each locking pin 92 having a projection received in one of a series of guide holes 69 provided in either one or both of upper 67 and lower 68 handlebar guide rails. Proximity sensors and/or a "dead man" key can be utilised in addition to prevent starting of, or to 'kill', the prime mover 200 in the event that the handlebars 62 are not locked in place. To reposition the handlebars 62, a driver can pull on the one or more biased locking pins 92 to remove the projection(s) from the respective guide hole or holes 69, and then translate the handlebars 62 to the desired position laterally along the guide rails 67, 68, whereupon the one or more biased locking pins 92 can be released and the projection(s) engaged into the respective guide hole or holes 69 corresponding to the new steering position. Alternatively, a friction lever arrangement could be utilised to provide for unlimited lateral arrangement. Furthermore, height adjustment may also be provided, e.g. by rotation of the steering assembly 60 about a transverse axis of the amphibian 10. While the steering control device described takes the form of handlebars 62, it could alternatively take the form of a steering wheel, steering levers, or any other suitable steering control device capable of conveying a steering input from the driver, as described above. However, the applicant has found that the use of handlebars has particular advantage in terms of optimising the full extent of steering input angle required for both land and marine mode steering (a steering wheel typically requires more than one full rotation from lock to lock, whereas handlebars require only a fraction of a full rotation).

Yet further important benefits of the steering assembly disclosed herein are that i) it enables throttle and braking functions to be easily translated together with the steering input device without the need or complexity of having to move foot control pedals, and ii) there is no steering disconnect required between land and marine mode changes. Both can remain connected throughout use in both the land and the marine modes, reducing complexity (familiarisation/ intuitiveness of use by the driver in both modes), and increasing safety (by avoiding the need for the disconnect/ reconnect of separate systems).

Figure 13:
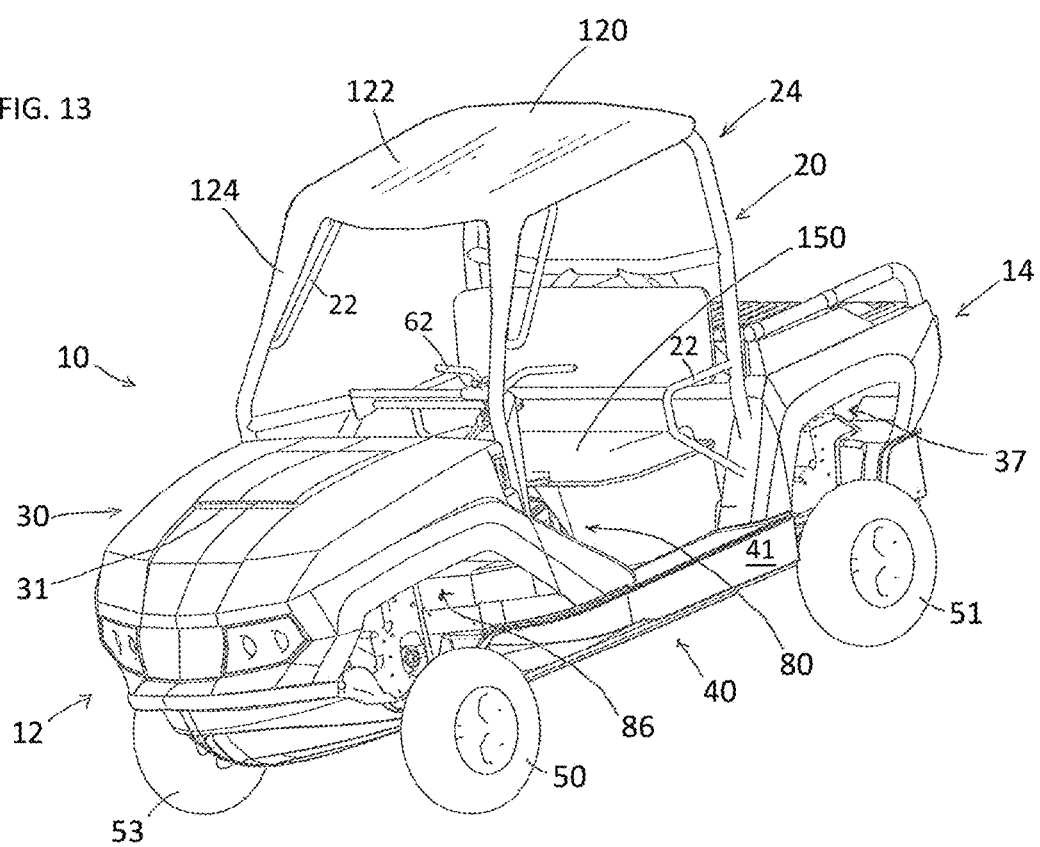
FIG. 13 is a schematic perspective view from the front and above of the amphibian of FIG. 1 provided with an optional positive buoyancy system.
Figure 14:
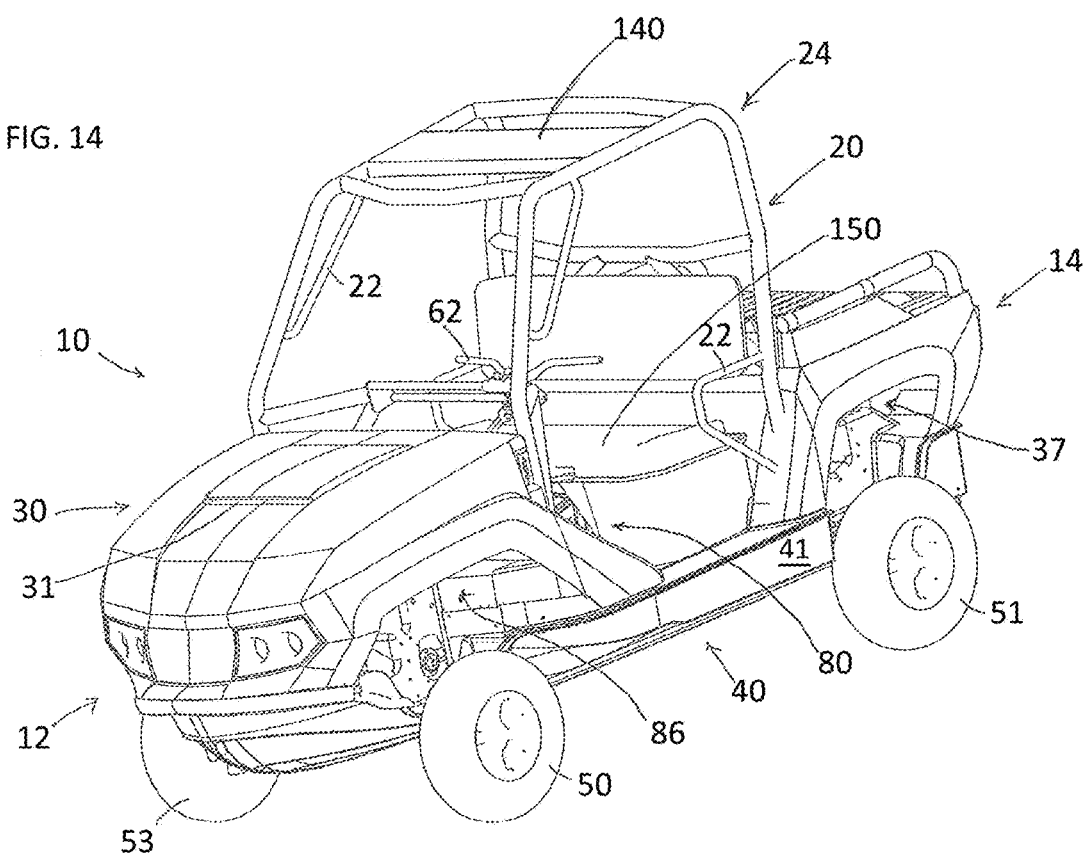
FIG. 14 is a schematic perspective view from the front and above of the amphibian of FIG. 1 provided with an optional deployable righting system.
Figure 15:
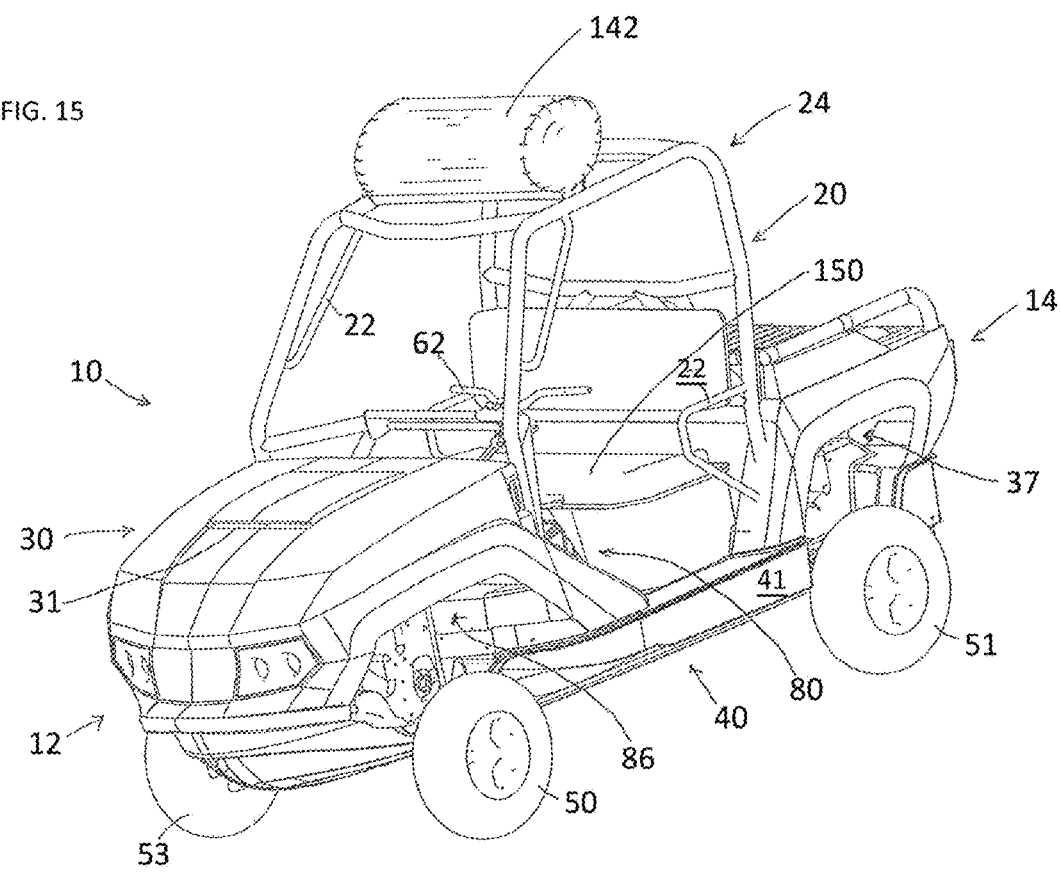
FIG. 15 is a schematic perspective view from the front and above of the amphibian of FIG. 14 with the deployable righting system deployed.

The roll over protection system (ROPS) 20 is configured to serve multiple different functions in the amphibian 20 according to the present invention. Not only does it serve as a structural component, with its roll cage providing the important function of protecting occupants in a roll over situation on land, but it can also be used to incorporate systems to prevent inversion in a capsize situation on water, and/or to provide for proactive righting of the amphibian 10 in an inversion or capsize situation. By way of example, and with reference to FIGS. 13 to 15 in particular, the upper frame 24 of the roll cage of the ROPS 20 can be provided with a positive buoyancy system 120 and/or a deployable righting system 140. The positive buoyancy system 120 is illustrated in FIG. 13 and takes the form of one or more low density (relative to water) closed cellular or enclosed volume structures 122, 124 mounted on or to the upper frame 24. This/these closed cellular or enclosed volume structures 122, 124 provide positive buoyancy in a capsize situation on water, displacing volumes of water with a lower density medium to provide for positive buoyancy. This reduces the likelihood of an inversion of the amphibian 10. Alternatively, or to complement the positive buoyancy system 120, a deployable righting system 140 may be employed, as illustrated in FIGS. 14 and 15. The deployable righting system 140 takes the form of an inflatable structure 142, inflation source and control system with sensors. The sensors can be configured to detect roll angle of the amphibian 10 relative to a datum (e.g. fully upright) position, and the control system can be set to trigger inflation of the inflatable structure 142 by the inflation source when a selected threshold is reached or passed. Suitable safeguards can be implemented to avoid an unnecessary trigger, such as sensing also that the amphibian is in the marine mode and/or that, for example, a water sensor mounted on the upper frame 24 has been submerged in water. Upon inflation of the inflatable structure 142, a significant righting force (given its position, i.e. distance up on the upper frame 24) is realised which flips the amphibian 10 upright. Furthermore, the positive buoyancy system 120 and/or deployable righting system 140 can also be configured and employed in land mode, serving to protect the driver and passengers from impacts by cushioning (not dissimilar to an airbag function in a land-only going vehicle).

Figure 6:
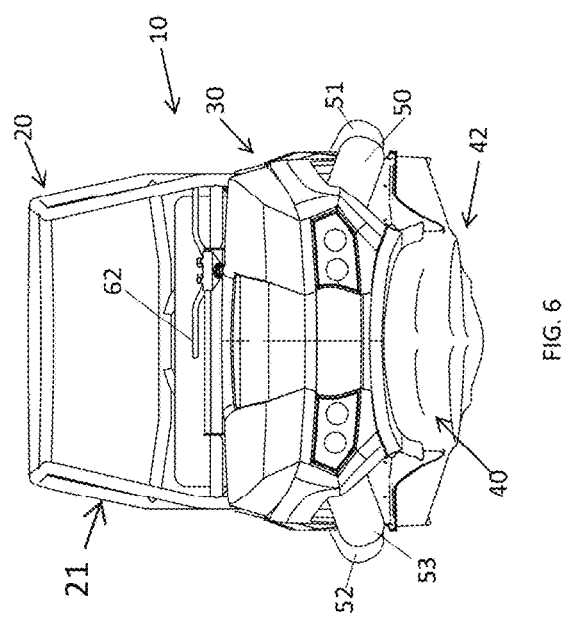
FIG. 6 is a schematic front elevation view of the amphibian of FIG. 1 with its wheels shown in a retracted position.
Figure 5:
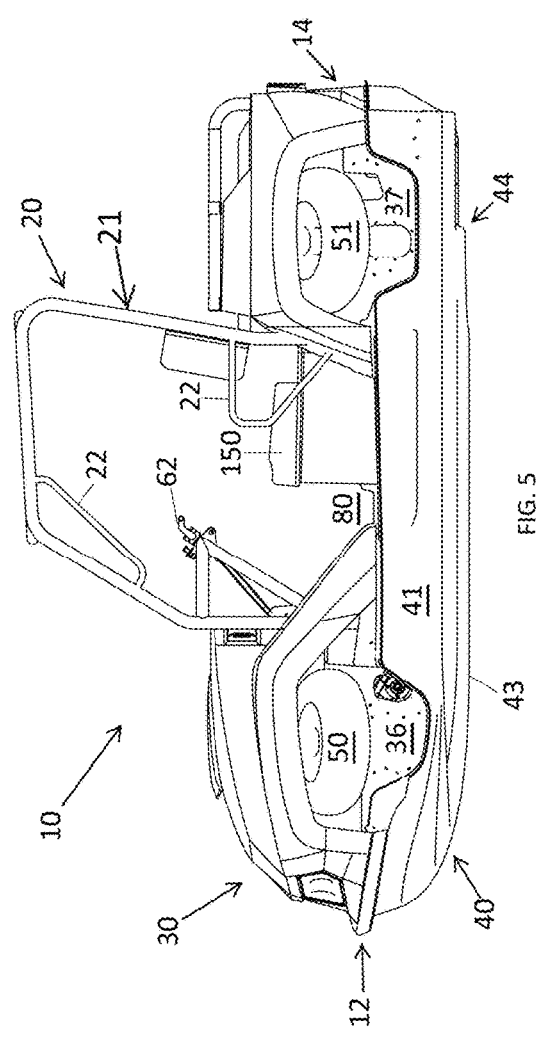
FIG. 5 is a schematic side elevation view of the amphibian of FIG. 1 with its wheels shown in a retracted position.
Figure 7:
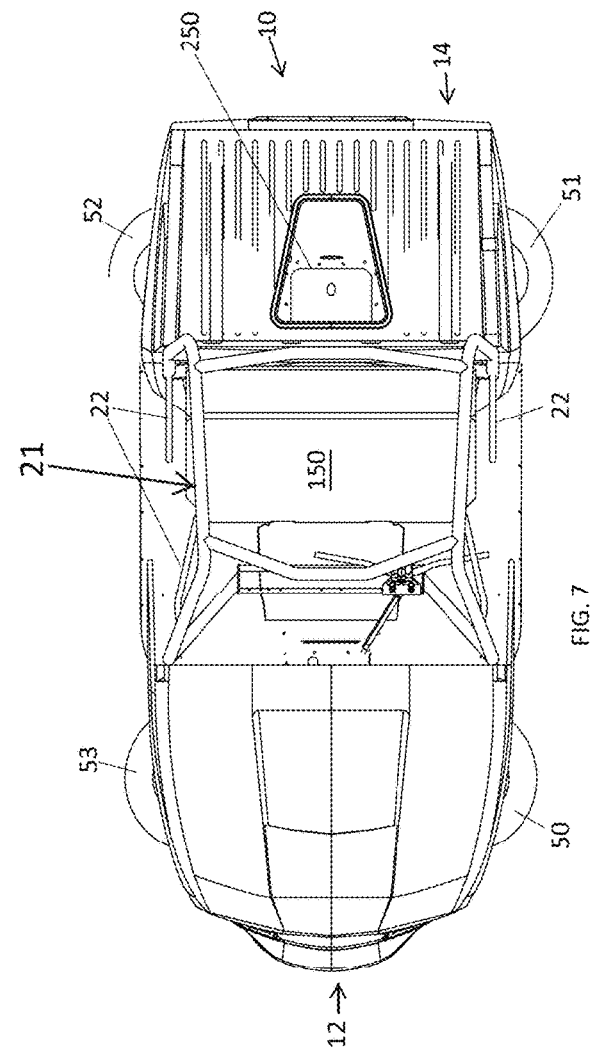
FIG. 7 is a schematic top plan view of the amphibian of FIG. 1 with its wheels shown in a retracted position.

Preferably, spring and damper assemblies are provided for the wheels 50, 51, 52, 53. Hydraulic (or other) actuators can be provided to allow the wheels to be retracted from their protracted positions shown in FIGS. 1 to 4 to their retracted positions shown in FIGS. 5 to 7. The hydraulic actuators are powered by hydraulic fluid supplies from a pump (not shown) powered by the prime mover 200. Each wheel suspension assembly comprises a suspension upright member connected to the outboard ends of upper and lower suspension arms, and arranged for retraction between protracted and retracted positions. The wheels 50, 51, 52 and 53 are each mounted to a hub rotatably engaged with and/or carried on the suspension upright member. The hydraulic actuators each have a piston rod which acts retract and protract the suspension assemblies about an axis running fore and aft longitudinally along the amphibian. Other actuators (e.g. electric rotary or linear, or pneumatic) may be employed.

Cooling is provided via a radiator located at the front of (or otherwise) the amphibian 10 acted on by the air entering via air inlet opening 31 and which can cool the prime mover 200, at least in use of the amphibian 10 on land. Cooling may additionally be provided by a water/water heat exchanger in use of the amphibian 10 in/on water, with water being drawn from outside the amphibian 10. In addition, exhaust cooling may be employed using the same heat exchangers/system, or by using separate dedicated heat exchangers of the same or similar form.

Whilst wheels have been described throughout as the land propulsion means, track drives or individual track drives (i.e. to replace a single wheel) may be used as an alternative or in combination with wheels. As such a reference to wheel or wheels in the description and claims is to be construed as including a track drive or track drives.

Each feature disclosed in this specification (including the accompanying claims and drawings) may be replaced by alternative features serving the same, equivalent or similar purpose, unless expressly stated otherwise. Thus, unless expressly stated otherwise, each feature disclosed is one example only of a generic series of equivalent or similar features. In addition, all of the features disclosed in this specification (including the accompanying claims and drawings), and/or all of the steps of a method or process, may be combined in any combination, except combinations where at least some of such features and/or steps are mutually exclusive. Accordingly, while different embodiments of the present invention have been described above, any one or more or all of the features described, illustrated and/or claimed in the appended claims may be used in isolation or in various combinations in any embodiment. As such, any one or more feature may be removed, substituted and/or added to any of the feature combinations described, illustrated and/or claimed. For the avoidance of doubt, any one or more of the features of any embodiment may be combined and/or used separately in a different embodiment with any other feature or features from any of the embodiments.

Whereas the present invention has been described in relation to what is presently considered to be the most practical and preferred embodiments, it is to be understood that the invention is not limited to the disclosed arrangements but rather is intended to cover various modifications and equivalent constructions included within the scope of the appended claims.

The invention claimed is:

1. An amphibian operable on land and on water, comprising:
   a planing hull having a longitudinally-extending center line, a first side and a second side opposite the first side;
   at least one retractable wheel, the at least one retractable wheel being retractable from a protracted land engaging position when the amphibian is operated on land to a retracted position when the amphibian is operated on water;
   at least one prime mover for providing power to drive, directly or indirectly, the amphibian on either one or both of land and water;
   at least one steerable wheel mechanically connected directly or indirectly to a steering control device operable by a driver to steer the amphibian, wherein the at least one steerable wheel and the steering control device operable by the driver remain connected throughout use in both the land and the marine modes such that there is no steering disconnect required during a change between land and marine modes, and wherein the steering control device includes at least one of handlebars, a steering wheel, and steering levers, and wherein the steering control device is positioned to be grasped by the driver while operating the amphibian; and
   wherein the steering control device operable by the driver is moveable between at least two distinct laterally spaced positions across a width or beam of the amphibian including between a first position and a third position or between a second position and the third position, wherein the first position is located between the longitudinally-extending center line and the first side of the planing hull such that a majority of the steering control device is located between the longitudinally-extending center line and the first side of the planing hull, the second position is located between the longitudinally-extending center line and the second side of the planing hull such that a majority of the steering control device is located between the longitudinally-extending center line and the second side of the planing hull, and the third position is located centrally of the first and second sides of the planing hull such that at least a part of the steering control device is located along the longitudinally-extending center line.

2. The amphibian as claimed in claim 1, wherein the amphibian is a utility task vehicle (UTV).

3. The amphibian as claimed in claim 1, further comprising:
side-by-side seating.

4. The amphibian as claimed in claim 3, wherein the side-by-side seating comprises one or more bench seats.

5. The amphibian as claimed in claim 1, further comprising:
a roll over protection system.

6. The amphibian as claimed in claim 1, further comprising:
either one or both of a positive buoyancy system and a deployable righting system.

7. The amphibian as claimed in claim 1, further comprising:
a cargo area.

8. The amphibian as claimed in claim 7, wherein the cargo area is positioned rearward of a crew or cab area.

9. The amphibian as claimed in claim 1, further comprising:
a footwell area having no transmission tunnel.

10. The amphibian as claimed in claim 1, wherein the footwell area does not comprise foot pedals.

11. The amphibian as claimed in claim 1, further comprising:
a roll cage.

12. The amphibian as claimed in claim 1, further comprising:
at least one marine propulsion device.

13. The amphibian as claimed in claim 1, wherein the planing hull comprises a V formation.

14. The amphibian as claimed in claim 1, further comprising:
a speed change transmission operably coupling the prime mover and one or both of i) at least one driven wheel or wheels and ii) at least one marine propulsion device.

15. The amphibian as claimed in claim 1, wherein the at least one retractable wheel is pivoted through 15° or more during retraction.

16. The amphibian as claimed in claim 1, wherein the at least one retractable wheel is retracted above a lowest point of the planing hull for use on water in marine mode, and is protracted below a lowest point of the planing hull for use on land in land mode.

17. The amphibian as claimed in claim 1, wherein when the amphibian is operated in a land mode one or more of the at least one retractable wheel may be driven.

18. The amphibian of claim 1, wherein the steering control device is moveable between the first position and the third position and between the second position and the third position.

19. The amphibian of claim 1, wherein the handlebars are mounted to upper and lower handlebar guide rails by a bearing housing, where the handlebar guide rails guide lateral translation of the handlebars.

20. An amphibian operable on land and on water, comprising:
a planing hull;
at least one retractable wheel, the at least one retractable wheel being retractable from a protracted land engaging position when the amphibian is operated on land to a retracted position when the amphibian is operated on water;
at least one prime mover for providing power to drive, directly or indirectly, the amphibian on either one or both of land and water;
a seating arrangement having a first seating position for a driver of the amphibian, a second seating position for the driver of the amphibian that is entirely laterally offset from the first seating position, and a third seating position for the operator of the amphibian between the first and second seating positions;
at least one steerable wheel mechanically connected directly or indirectly to a steering control device operable by a driver to steer the amphibian, wherein the at least one steerable wheel and the steering control device operable by the driver remain connected throughout use in both the land and the marine modes such that there is no steering disconnect required during a change between land and marine modes; and
wherein the steering control device operable by the driver is moveable between at least two distinct laterally spaced positions across a width or beam of the amphibian including between a first position and a third position or between a second position and a third position, where the first position is laterally aligned with the first seating position, the second position is laterally aligned with the second seating position, and the third position is laterally aligned with the third seating position.

21. The amphibian of claim 20, wherein the steering control device includes handlebars.

22. An amphibian operable on land and on water, comprising:
a planing hull;
at least one retractable wheel, the at least one retractable wheel being retractable from a protracted land engaging position when the amphibian is operated on land to a retracted position when the amphibian is operated on water;
at least one prime mover for providing power to drive, directly or indirectly, the amphibian on either one or both of land and water;
at least one steerable wheel mechanically connected directly or indirectly to a steering control device operable by a driver to steer the amphibian, wherein the at least one steerable wheel and the steering control device operable by the driver remain connected throughout use in both the land and the marine modes such that there is no steering disconnect required during a change between land and marine modes, and wherein the steering control device is positioned to be grasped by the driver while operating the amphibian; and wherein the steering control device operable by the driver is slidably moveable between at least two distinct laterally spaced positions across a width or beam of the amphibian, wherein the at least two distinct laterally spaced positions are substantially offset from one another during operation of the steering control device and comprise i) a center driving position of the amphibian and a right hand driving position of the amphibian, or ii) the center driving position of the amphibian and a left hand driving position of the amphibian.

* * * * *